(12) United States Patent
Xia et al.

(10) Patent No.: US 10,651,544 B2
(45) Date of Patent: May 12, 2020

(54) ANTENNA SYSTEM AND MOBILE TERMINAL

(71) Applicant: AAC Technologies Pte. Ltd., Singapore (SG)

(72) Inventors: Xiaoyue Xia, Shenzhen (CN); Chao Wang, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/057,946

(22) Filed: Aug. 8, 2018

(65) Prior Publication Data
US 2019/0181538 A1    Jun. 13, 2019

(30) Foreign Application Priority Data
Dec. 13, 2017  (CN) .......................... 2017 1 1326037

(51) Int. Cl.
| | |
|---|---|
| *H01Q 1/24* | (2006.01) |
| *H01Q 21/22* | (2006.01) |
| *H01Q 3/38* | (2006.01) |
| *H01Q 21/00* | (2006.01) |
| *H01Q 21/28* | (2006.01) |
| *H04M 1/02* | (2006.01) |
| *H01Q 3/40* | (2006.01) |

(52) U.S. Cl.
CPC .............. *H01Q 1/243* (2013.01); *H01Q 3/38* (2013.01); *H01Q 3/40* (2013.01); *H01Q 21/0025* (2013.01); *H01Q 21/22* (2013.01); *H01Q 21/28* (2013.01); *H04M 1/026* (2013.01); *H04M 1/0277* (2013.01)

(58) Field of Classification Search
CPC ............ H01Q 1/24; H01Q 1/243; H01Q 3/38; H01Q 21/00; H01Q 21/0025; H01Q 21/22
See application file for complete search history.

(56) References Cited

U.S. PATENT DOCUMENTS

| | | | | |
|---|---|---|---|---|
| 2016/0308563 | A1* | 10/2016 | Ouyang | H04B 1/1081 |
| 2017/0309991 | A1* | 10/2017 | Noori | H01Q 5/49 |

* cited by examiner

*Primary Examiner* — Hoang V Nguyen
(74) *Attorney, Agent, or Firm* — IPro, PLLC; Na Xu (57) ABSTRACT

The present disclosure discloses an antenna system and a mobile terminal. The antenna system includes a first feeding point, a first millimeter-wave array antenna electrically connected to the first feeding point, a second feeding point, a second millimeter-wave array antenna electrically connected to the second feeding point, a third feeding point, a third millimeter-wave array antenna electrically connected to the third feeding point, a fourth feeding point, and a fourth millimeter-wave array antenna electrically connected to the fourth feeding point, which are all disposed on the circuit board. Beams of the first millimeter-wave array antenna cover a space of X>0. Beams of the second millimeter-wave array antenna cover a space of X<0. Beams of the third millimeter-wave array antenna cover a space of Y>0. Beams of the fourth millimeter-wave array antenna cover a space of Y<0.

7 Claims, 11 Drawing Sheets

ANTENNA SYSTEM AND MOBILE TERMINAL

CROSS-REFERENCE TO RELATED APPLICATIONS

The present application claims priority to Chinese Patent Application No. 201711326037.3, filed on Dec. 13, 2017, the content of which is incorporated herein by reference in its entirety.

TECHNICAL FIELD

The embodiments of the present disclosure relate to the field of communications, and in particular, to an antenna system and a mobile terminal.

BACKGROUND

With the constant development of communication technologies, the Fifth-Generation mobile communication technology (5G) can be seen behind these cool hot technologies such as a virtual reality technology, an unmanned aerial vehicle technology, and an autopilot technology. The fifth-generation mobile communication technology is an extension of 4G and is currently under study. The theoretical downlink speed of the 5G network is 10 Gb/s (which is equivalent to a download speed of 1.25 GB/s). In terms of capacity, the mobile data traffic per unit area of the 5G communication technology is increased by 1000 times than 4G. In terms of transmission rate, the typical user data rate is increased by 10 to 100 times and the peak transmission rate can reach 10 Gbps (which is 100 Mbps in 4G). It can be seen therefrom that 5G will fully surpass 4G in all aspects to achieve the true fusion network.

The International Telecommunication Union (ITU) defined main application scenarios of 5G at the ITU-RWPSD 22nd meeting held on June 2015. The ITU defines three main application scenarios: enhanced mobile broadband, large-scale machine communications, and highly reliable low-latency communications. These three application scenarios correspond to different key indicators respectively. Under the enhanced mobile bandwidth scenario, the user peak velocity is 20 Gbps, and the minimum user experience rate is 100 Mbps. Many key technologies, such as a millimeter wave technology and a beam-forming technology, are adopted in 5G communication to achieve the above indicators. Rich bandwidth resources of a millimeter wave band provide guarantees for high-speed transmission rates. However, due to the severe spatial loss of electromagnetic waves in this band, phased array architecture is needed for a wireless communication system using the millimeter wave band. By means of a phase shifter, the phase positions of the array elements are distributed according to a certain rule, thereby forming a high-gain beam. In addition, by the change in phase shift, the beams are scanned within a certain spatial range.

In the beam-forming technology of 5G communication, a base station side has multiple antennas and may automatically adjust phase positions of signals transmitted from the antennas to form a superposition of electromagnetic waves at a terminal receiving point, thereby improving the received signal strength. The inventor has found that the related art has at least the following problems: a 5G terminal also needs to use a millimeter-wave phased array antenna and has a phased array of N*N dot matrix. However, this phased array takes up a large space of a mobile phone and is not easy to deploy, and setting of a scanning angle of this phased array is complicated. Because the scanning coverage of a single phased array antenna is generally smaller than a hemisphere, if the 5G terminal adopts the single phased array antenna, there may be a problem that a smart terminal is unstable in signal receiving.

BRIEF DESCRIPTION OF DRAWINGS

One or more embodiments are illustrated by way of examples with reference to the figures in the drawings corresponding to the respective embodiments. These exemplary illustrations are not intended to limit the embodiments. Throughout the drawings, the same reference numbers represent similar elements. Unless otherwise specified, the drawings are not drawn according to the scale.

DESCRIPTION OF EMBODIMENTS

In order to make the objectives, technical solutions, and advantages of the present disclosure more clear, various embodiments of the present disclosure are described in detail below with reference to the accompanying drawings. However, an ordinary person skilled in the art may understand that many technical details are set forth in various embodiments of the present disclosure to give the reader a fuller understanding of the present disclosure. However, even though theses technical details and various changes and modifications based on the following embodiments are not set forth, the claimed technical solution of the present disclosure may be implemented.

Figure 1:
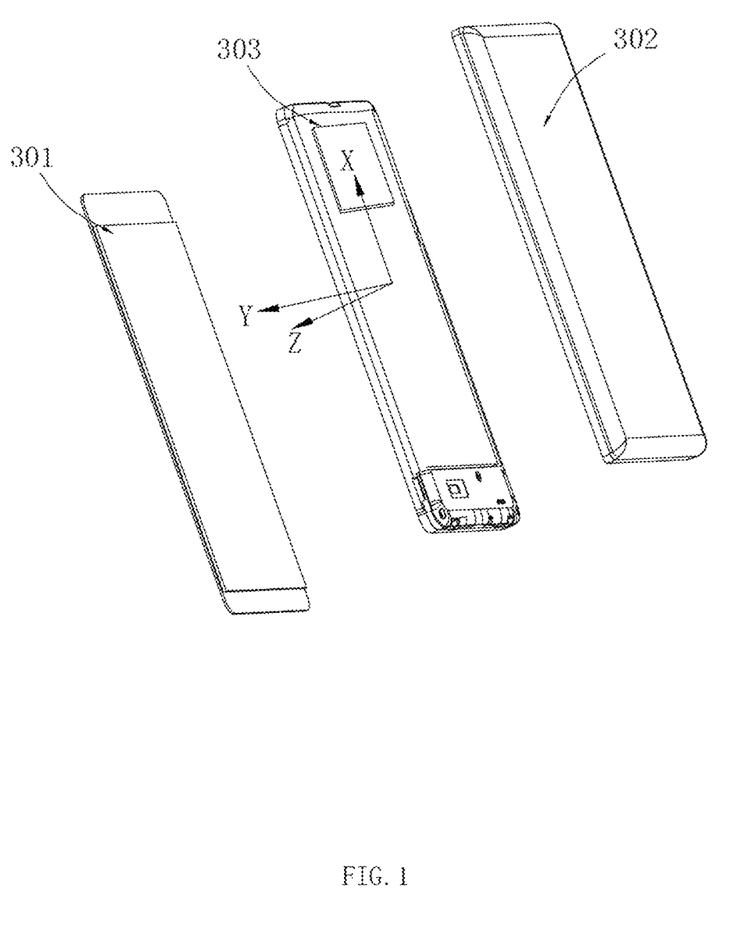
FIG. 1 is an exploded schematic diagram of a mobile terminal to which an antenna system provided according to the first embodiment of the present disclosure is applied.

A first embodiment of the present disclosure relates to an antenna system 10. The antenna system 10 is applied to a mobile terminal. The mobile terminal is provided with a screen 301, a back shell 302 arranged opposite to the screen 301, a circuit board 303 sandwiched between the screen 301 and the back shell 302, as shown in FIG. 1 which is an exploded view. The mobile terminal may be a smart phone, a smart watch or the like. In the present embodiment, the mobile terminal is illustrated as the smart phone.

The antenna system includes a first feeding point 101, a first millimeter-wave array antenna 102 electrically connected to the first feeding point 101, a second feeding point 103, a second millimeter-wave array antenna 104 electrically connected to the second feeding point 103, a third feeding point 105, a third millimeter-wave array antenna 106 electrically connected to the third feeding point 105, a fourth feeding point 107, and a fourth millimeter-wave array antenna 108 electrically connected to the fourth feeding point 107, which are all disposed on the circuit board 303.

For ease of description, the mobile terminal is placed in a three-dimensional coordinate system that takes the center of the mobile terminal as an origin. An X axis of the three-dimensional coordinate system extends in a major-axis direction of the mobile terminal. A Y axis of the three-dimensional coordinate system extends in a minor-axis direction of the mobile terminal. A Z axis of the three-dimensional coordinate system extends in a thickness direction of the mobile terminal. A positive axis of the X axis points to the top of the mobile terminal. A positive axis of the Z axis points to the screen.

Figure 2:
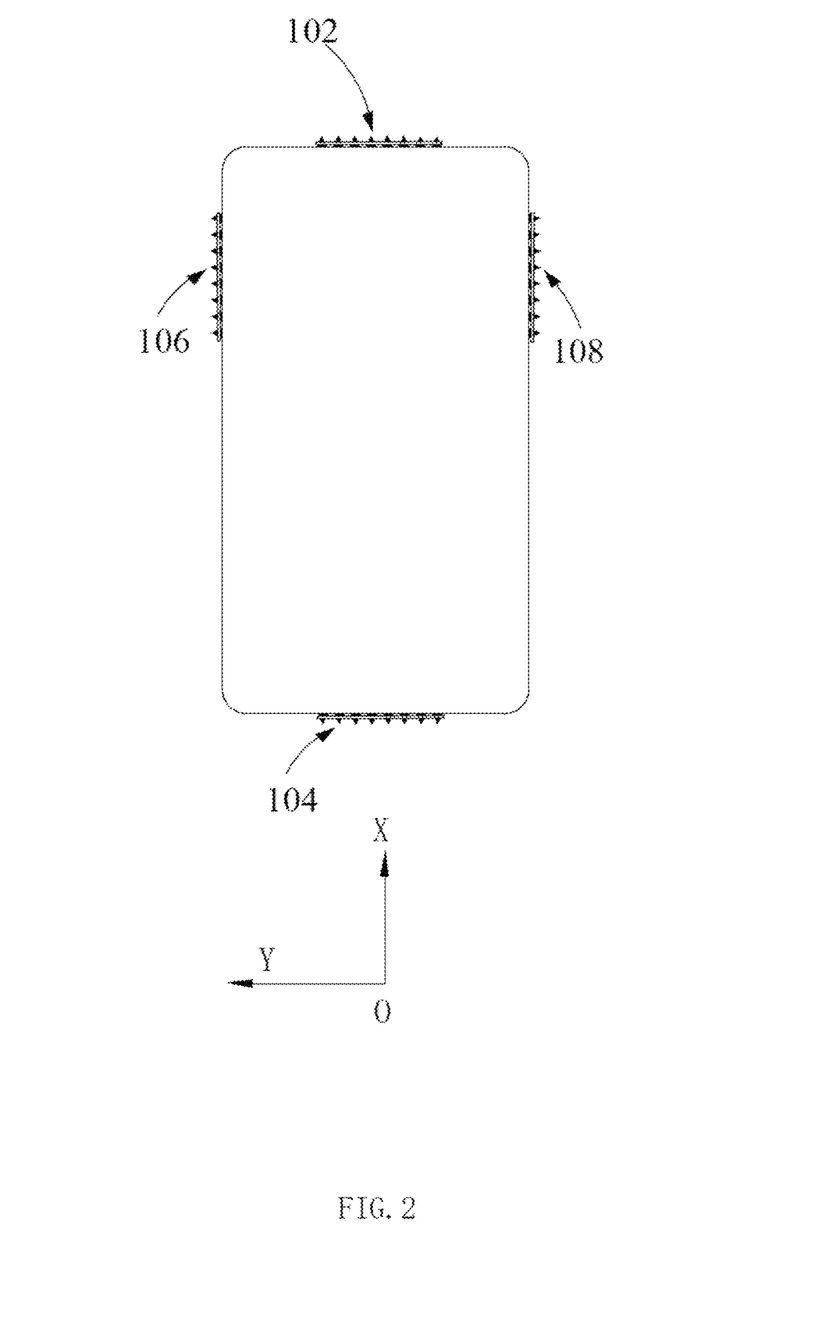
FIG. 2 is a schematic diagram of antenna distribution in the antenna system provided according to the first embodiment of the present disclosure.

As shown in FIG. 2, the four millimeter-wave array antennas, namely, the first millimeter-wave array antenna 102, the second millimeter-wave array antenna 104, the third millimeter-wave array antenna 106 and the fourth millimeter-wave array antenna 108, are disposed in the antenna system involved in the present embodiment in total.

Figure 3A:
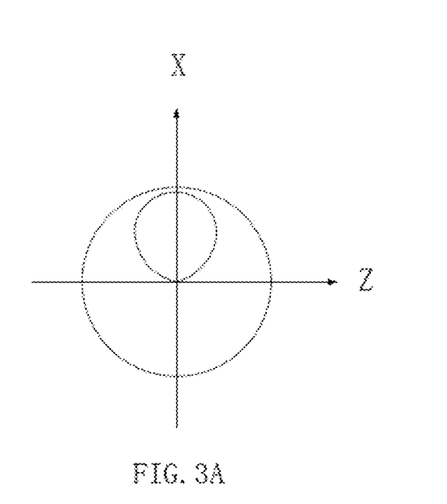
FIG. 3A is a schematic diagram of the main beam of the first millimeter-wave array antenna pointing to a space of X>0.
Figure 3B:
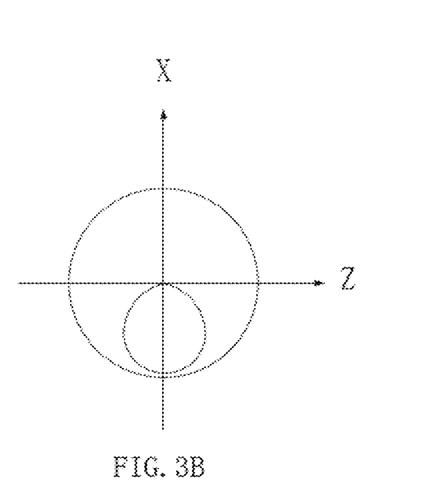
FIG. 3B is a schematic diagram of the main beam of the second millimeter-wave array antenna pointing to a space of X<0.
Figure 3C:
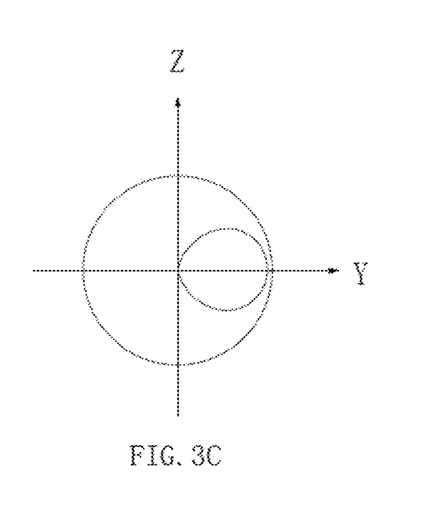
FIG. 3C is a schematic diagram of the main beam of the third millimeter-wave array antenna pointing to a space of Y>0.
Figure 3D:
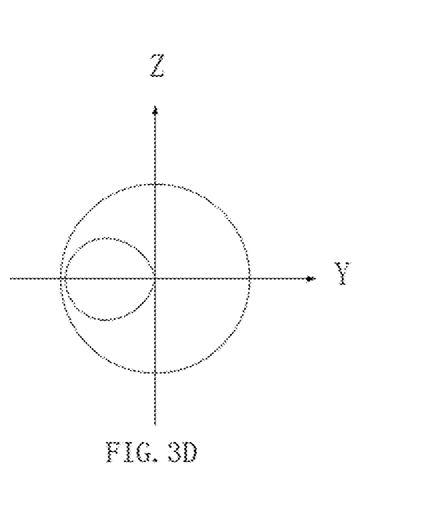
FIG. 3D is a schematic diagram of the main beam of the fourth millimeter-wave array antenna pointing to a space of Y<0.

As shown in FIG. 3A, main beams of the first millimeter-wave array antenna point to a space of X>0. As shown in FIG. 3B, main beams of the second millimeter-wave array antenna point to a space of X<0. As shown in FIG. 3C, main beams of the third millimeter-wave array antenna point to a space of Y>0. As shown in FIG. 3D, main beams of the fourth millimeter-wave array antenna point to a space of Y<0.

Figure 4:
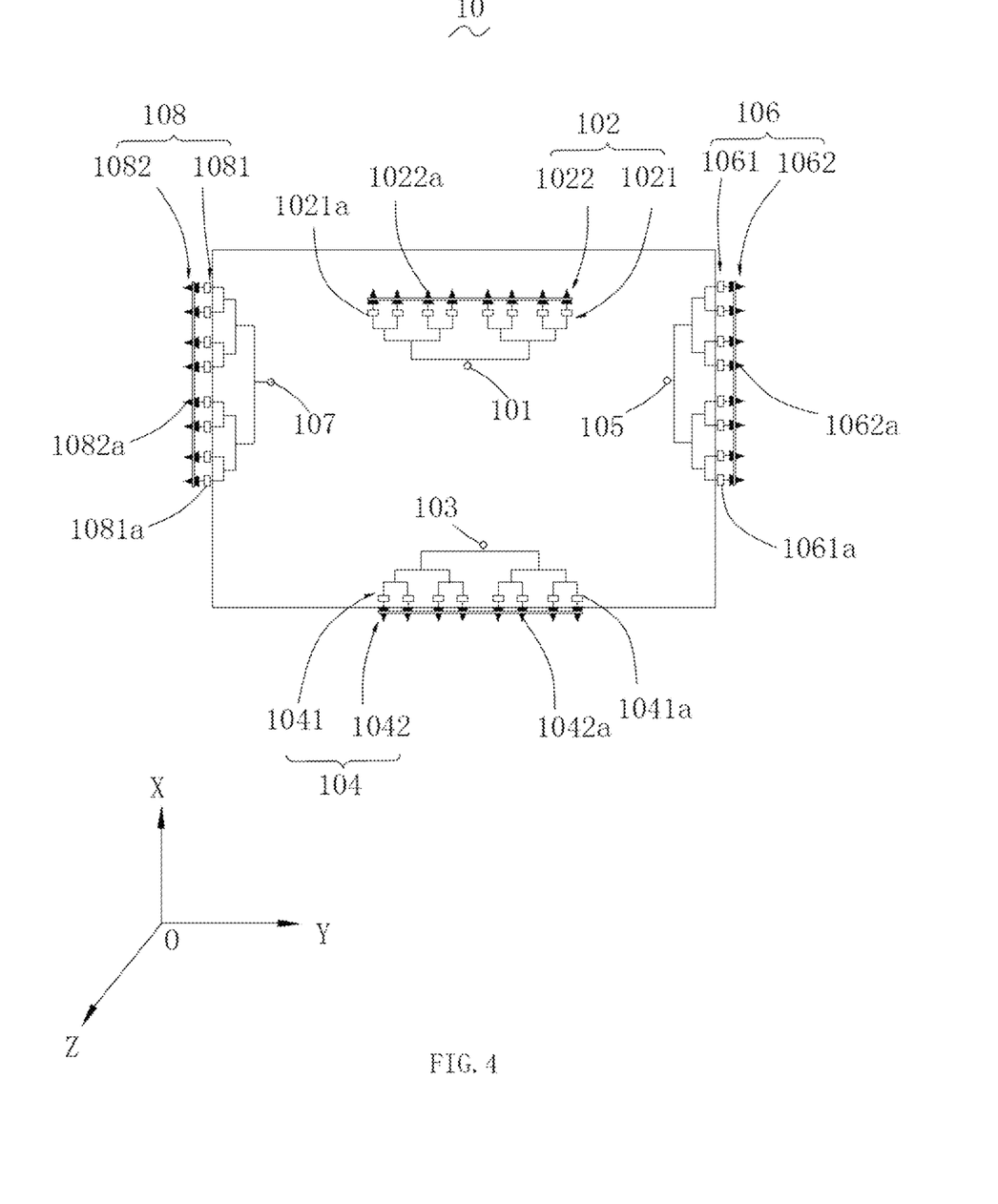
FIG. 4 is a schematic diagram of a specific structure, facing back to a positive direction of a Z axis, of an antenna system provided according to the first embodiment of the present disclosure.

In an embodiment, the circuit board 303 is provided with a first feeding point 101, a second feeding point 103, a third feeding point 105 and a fourth feeding point 107. The first millimeter-wave array antenna 102 includes a first feeding network 1021 connected to the first feeding point 101 and a first antenna array face 1022 fed by the first feeding network 1021. The second millimeter-wave array antenna 104 includes a second feeding network 1041 connected to the second feeding point 103 and a second antenna array face 1042 fed by the second feeding network 1041. The third millimeter-wave array antenna 106 includes a third feeding network 1061 connected to the third feeding point 105 and a third antenna array face 1062 fed by the third feeding network 1061. The fourth millimeter-wave array antenna 108 includes a fourth feeding network 1081 connected to the fourth feeding point 107 and a fourth antenna array face 1082 fed by the fourth feeding network 1081. The specific settings of the antenna system are as shown in FIG. 4.

The first antenna array face 1022 includes a plurality of first antenna units 1022a. The second antenna array face 1042 includes a plurality of second antenna units 1042a. The third antenna array face 1062 includes a plurality of third antenna units 1062a. The fourth antenna array face 1082 includes a plurality of fourth antenna units 1082a.

Specifically, the number of the first antenna units 1022a included in the first antenna array face 1022, the number of the second antenna units 1042a included in the second antenna array face 1042, the number of the third antenna units 1062a included in the third antenna array face 1062 and the number of the fourth antenna units 1082a included in the fourth antenna array face 1082 may be the same or different. For example, the first antenna array face 1022 includes four first antenna units 1022a. The second antenna array face 1042 includes five second antenna units 1042a. The third antenna array face 1062 includes six third antenna units 1062a. The four antenna arrays 1082 include seven fourth antenna units 1082a.

In the present embodiment, the number of the first antenna units 102a, the number of the second antenna units 104a, the number of the third antenna units 106a, and the number of the fourth antenna units 10*a are the same, i.e., eight respectively.

In the present embodiment, the first feeding network 1021 includes a plurality of first phase shifters 1021a whose number is the same as the number of the first antenna units 1022a. Each of the first antenna units 1022a is electrically connected to the first feeding point 101 via one of the first phase shifters 1021a. The second feeding network 1041 includes a plurality of second phase shifters 1041a whose number is the same as the number of the second antenna units 1042a. Each of the second antenna units 1042a is electrically connected to the second feeding point 103 via one of the second phase shifters 1041a. The third feeding network 1061 includes a plurality of third phase shifters 1061a whose number is the same as the number of the third antenna units 1062a. Each of the third antenna units 1062a is electrically connected to the third feeding point 105 via one of the third phase shifters 1061a. The fourth feeding network 1081 includes a plurality of fourth phase shifters 1081a whose number is the same as the number of the fourth antenna units 1082a. Each of the fourth antenna units 1082a is electrically connected to the fourth feeding point 107 via one of the fourth phase shifters 1081a. The specific connection structures are as shown in FIG. 4.

In the present embodiment, each phase shifter is a 5-bit phase shifter with a phase-shift accuracy of 11.25 degrees. Of course, the phase-shift accuracy and the bit number of the phase shifter may be determined according to actual situations, and will not be limited.

It should be noted that in the present embodiment, one phase shifter is configured for each radiation unit. However, in other embodiments, one phase shifter may be configured commonly for a plurality of antenna units.

In the present embodiment, each of the antenna array faces is in a form of a one-dimensional linear array. The first antenna units 1022a and the second antenna units 1042a are respectively arranged into a one-dimensional linear array at intervals along a Y axis direction. The third antenna units 1062a and the fourth antenna units 1082a are respectively arranged into a one-dimensional linear array at intervals along an X axis direction. As shown in FIG. 2 and FIG. 4, the first antenna array face 1022 and the second antenna array face 1042 are disposed on two opposite sides in the X axis direction respectively, the first antenna array face 1022 faces the positive axis of the X axis, and the second antenna array face 1042 faces the negative axis of the X axis. The third antenna array face 1062 and the fourth antenna array face 1082 are disposed on two opposite sides in the Y axis direction respectively, the third antenna array face 1062 faces the positive axis of the Y axis, and the fourth antenna array face 1082 faces the negative axis of the Y axis.

According to the antenna system provided by the present embodiment, beam scanning of the antenna arrays may be controlled through the phase shifters. Due to the one-dimensional linear arrays adopted by the antenna arrays, the phase shifter in each millimeter-wave array antenna only needs to scan one angle, which can simplify the scanning difficulty of the millimeter-wave array antenna.

It should be noted that the arrangement form of the antenna units and the setting positions of the antenna array faces are not limited to the present embodiment. In other embodiments, a planar array may be used, and the antenna array faces may be set in other positions. For example, when an end-fire array is used as the millimeter-wave array antenna, if beams of the end-fire array point to the positive axis direction of the Y axis, then antenna units of the end-fire array may be arranged along the Y axis, unlike the third millimeter-wave array antenna in the present embodiment, whose third antenna array face is arranged in the X axis direction.

In addition, the antenna array face may be disposed on the circuit board, or may be disposed on a support, or may be disposed on a housing by press-fitting, LDS, etc., or may be a metal housing itself, respectively. The specific implementation depends on the actual situation of the mobile terminal and will not be limited in the present disclosure. For example, the first antenna array face 1022 may be disposed on a top support of the circuit board 303, or may be formed by a metal top frame itself. The second antenna array face 1042 may be disposed on a bottom support of the circuit board 303, or may be formed by a metal bottom frame itself. The third antenna array face 1062 and the fourth antenna array face 1082 may be disposed on a side support of the circuit board 303, or may be formed by a metal frame itself.

In the present embodiment, the first antenna array face 1022 is disposed on the top of the mobile terminal, and the second antenna array face 1042 is disposed on the bottom of the mobile terminal. Both the third antenna array face 1062 and the fourth antenna array face 1082 are closer to the top of the mobile terminal, than to the bottom of the mobile terminal.

This is because the side edge of the mobile terminal close to the bottom is often a hand-held part of a user, but the top and the bottom of the mobile terminal are least affected by the user, which is conducive to signal propagation.

In addition, in the present disclosure, the four millimeter-wave arrays are placed close to a main board or a small board respectively, such that the line loss of a radio frequency front end (RFFE) to the antenna units is reduced.

An operating principle and an operating effect of the antenna system 10 will be described below in detail using a smart phone as an example.

Figure 5A:
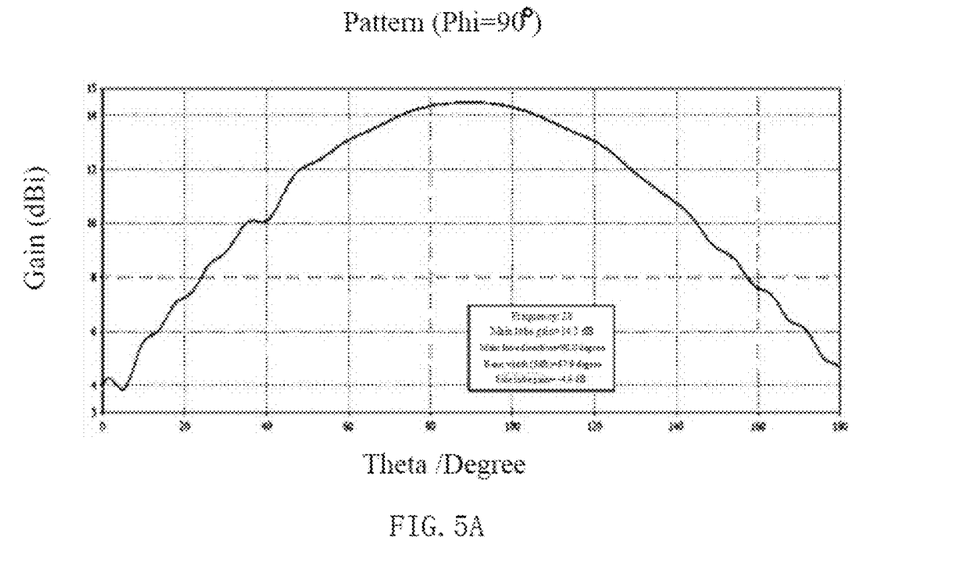
FIG. 5A is a pattern of a third millimeter-wave array antenna on an H plane when various third antenna units are fed at a constant amplitude and a same phase in the antenna system provided according to the first embodiment of the present disclosure.
Figure 5B:
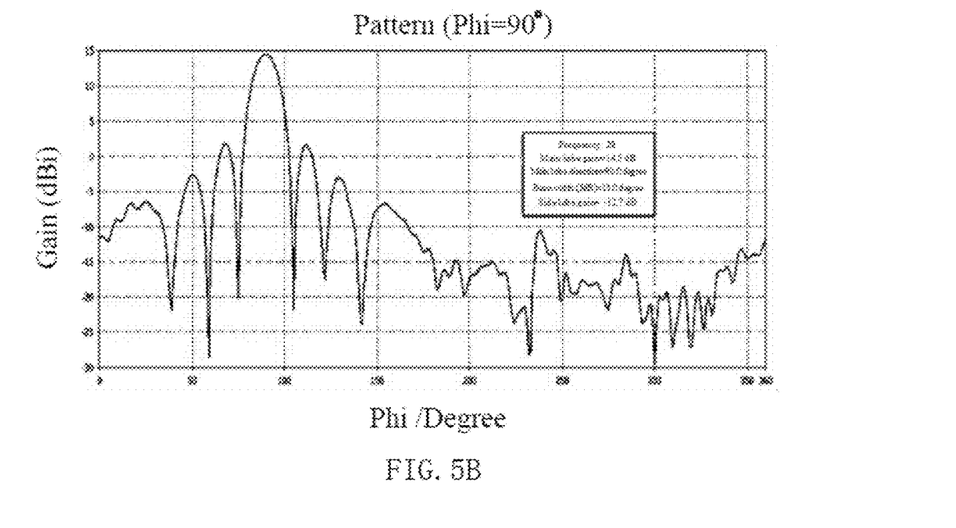
FIG. 5B is a pattern of the third millimeter-wave array antenna on an E plane when various third antenna units are fed at a constant amplitude and a same phase in the antenna system provided according to the first embodiment of the present disclosure.

Taking the third millimeter-wave array antenna 106 as an example, as shown in FIG. FIG. 3C, the beams of the third millimeter-wave array antenna point to a space of Y>0. As shown in FIG. 5A and FIG. 5B, the third millimeter-wave array antenna 106 operates at 28 GHz. When each third antenna unit 1062a is fed at a constant amplitude and a same phase, the main beams of the third millimeter-wave array antenna point to a direction of Phi=90°, i.e., a positive axis direction of the Y axis. In addition, the main beams are wide in an elevation plane)(Phi=90°), but are narrow in an azimuth plane (Theta=90 degrees), and the 3 dB beam width is 13 degrees (deg). The maximum gain of a main lobe is 14.5 dB, and a gain of a side lobe is −12.7 dB.

By controlling the phase position of each third antenna unit 1062a by the third phase shifter 1061a, the third millimeter-wave array antenna 106 implements beam scanning along the azimuth angle in a half space of Y>0 to compensate for the defect of narrower beam width in the azimuth plane.

Similarly, the fourth millimeter-wave array antenna 108 also has wide beams in the elevation plane and can implement beam scanning in a space of Y<0.

It can be seen that the third millimeter-wave array antenna 106 has relatively strong beam coverage in the space of Y>0. The fourth millimeter-wave array antenna 108 has relatively strong beam coverage in the space of Y<0. The beam coverage of the third millimeter-wave array antenna 106 and the beam coverage of the fourth millimeter-wave array antenna 108 are complementary to each other, which enhances the radiation capability of the original weak radiation region.

Figure 7:
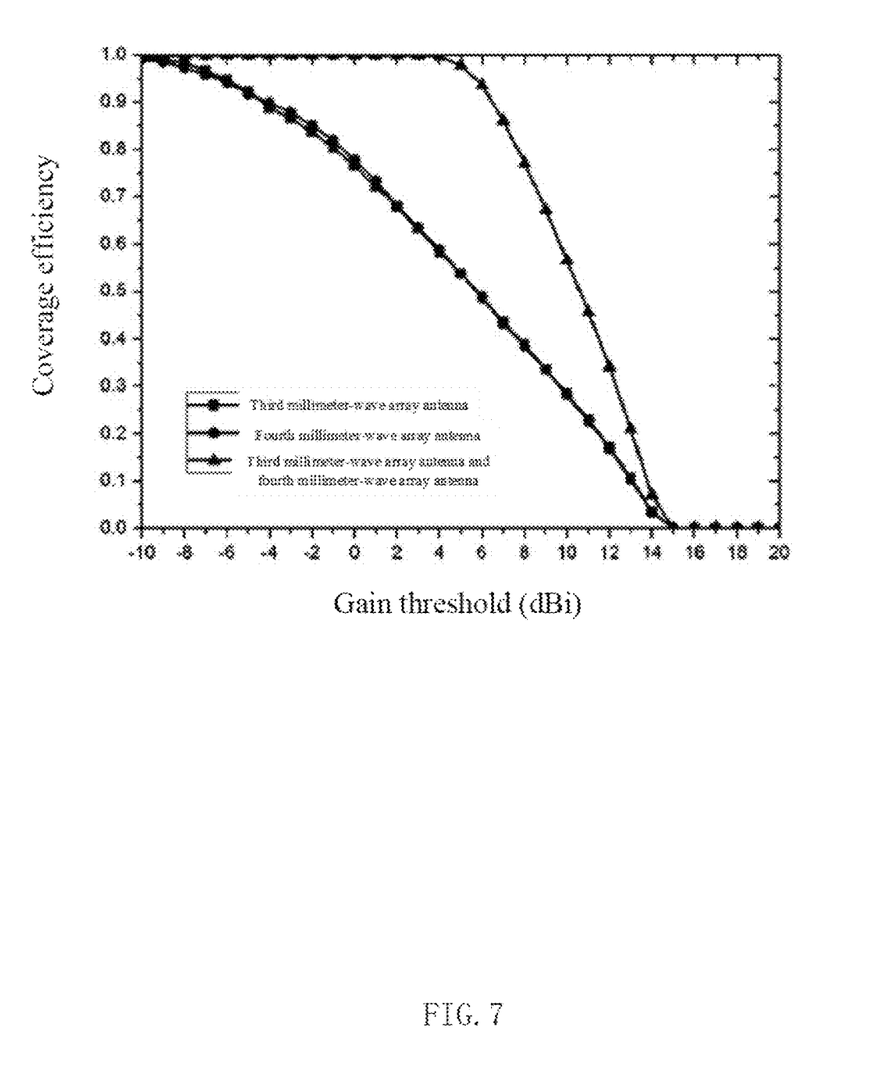
FIG. 7 is a radiation coverage efficiency diagram when the third millimeter-wave array antenna and a fourth millimeter-wave array antenna in the antenna system provided according to the first embodiment of the present disclosure operate.

The beam coverage efficiency when the third millimeter-wave array antenna 106 and the fourth millimeter-wave array antenna 108 operate separately or simultaneously is as shown in FIG. 7. As can be seen from FIG. 7, the beam coverage efficiency when the third millimeter-wave array antenna 106 and the fourth millimeter-wave array antenna 108 operate simultaneously is much greater than the beam coverage efficiency when they operate separately.

Similarly, when each first antenna unit 1022a of the first millimeter-wave array antenna 102 is fed at a constant amplitude and a same phase, the main beams of the first antenna unit point to the positive axis of the X axis, are wide in an XOZ plane, but are relatively narrow in an XOY plane. Upon the control of the phase shifter, scanning along the XOY plane may be achieved. The second millimeter-wave array antenna 104 is similar to the first millimeter-wave array antenna 102 except that the radiation directions are opposite. It can be seen that the first millimeter-wave array antenna 102 has relatively strong beam coverage in the space of X>0. The second millimeter-wave array antenna 104 has relatively strong beam coverage in the space of X<0. The beam coverage of the first millimeter-wave array antenna 102 and the beam coverage of the second millimeter-wave array antenna 104 are complementary to each other, which enhances the radiation capability of the original weak radiation region.

Figure 6:
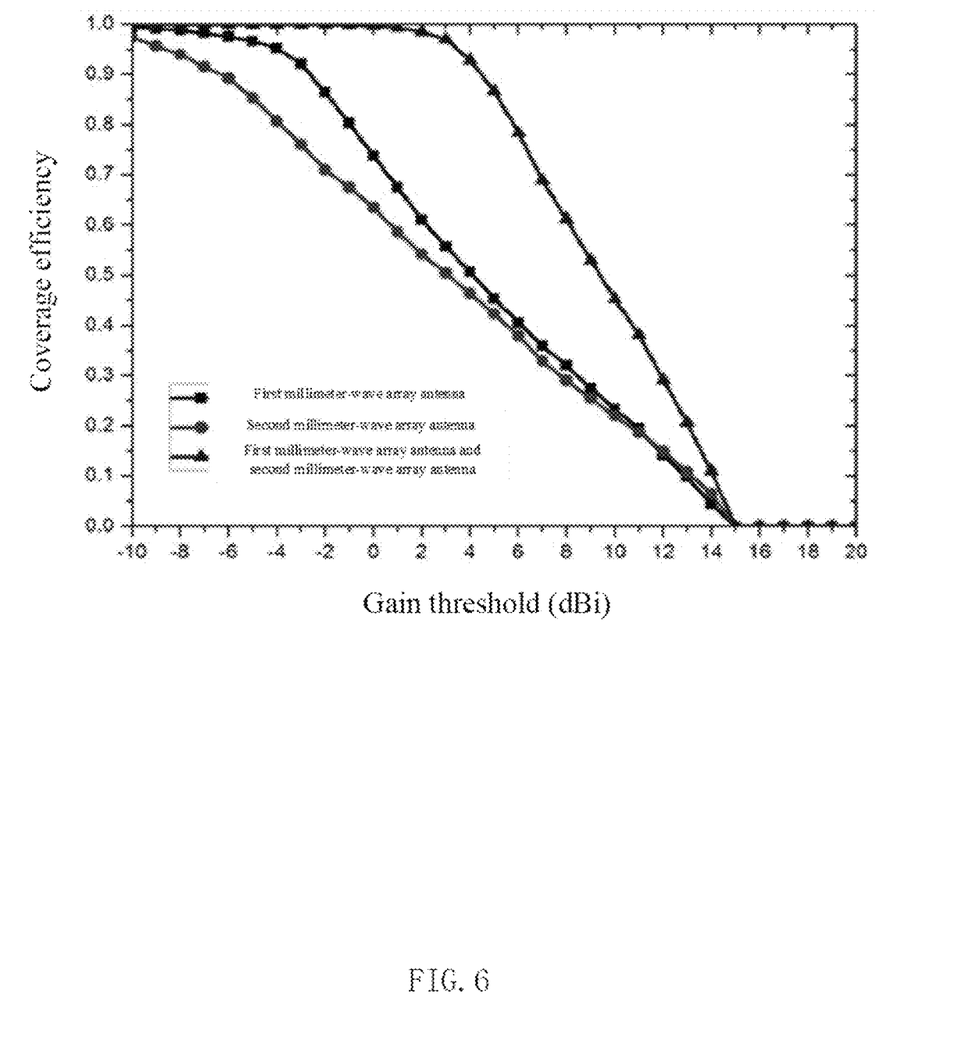
FIG. 6 is a radiation coverage efficiency diagram when the first millimeter-wave array antenna and a second millimeter-wave array antenna in the antenna system provided according to the first embodiment of the present disclosure operate.

The beam coverage efficiency when the first millimeter-wave array antenna 102 and the second millimeter-wave array antenna 104 operate separately or simultaneously is as shown in FIG. 6. As can be seen from FIG. 6, the beam coverage efficiency when the first millimeter-wave array antenna 102 and the second millimeter-wave array antenna 104 operate simultaneously is much greater than the beam coverage efficiency when they operate separately.

It is worth mentioning that although the third millimeter-wave array antenna 106 and the fourth millimeter-wave array antenna 108 have wide beams in the elevation planes and implement scanning along the azimuth angle, the gains of the beams of the third millimeter-wave array antenna 106 and the fourth millimeter-wave array antenna 108 are not large, i.e., the signals are weak, in the positive axis direction of the X axis and the negative axis direction of the X axis as well as their peripheral areas. The maximum beam pointing of the first millimeter-wave array antenna 102 is exactly the positive axis direction of the X axis, and the maximum beam pointing of the second millimeter-wave array antenna 104 is exactly the negative axis direction of the X axis. Therefore, when a combination of the first millimeter-wave array antenna 102 and the second millimeter-wave array antenna 104 and a combination of the third millimeter-wave array antenna 106 and the fourth millimeter-wave array antenna 108 operate simultaneously, the coverage efficiency of the antenna system will be further improved.

Figure 8:
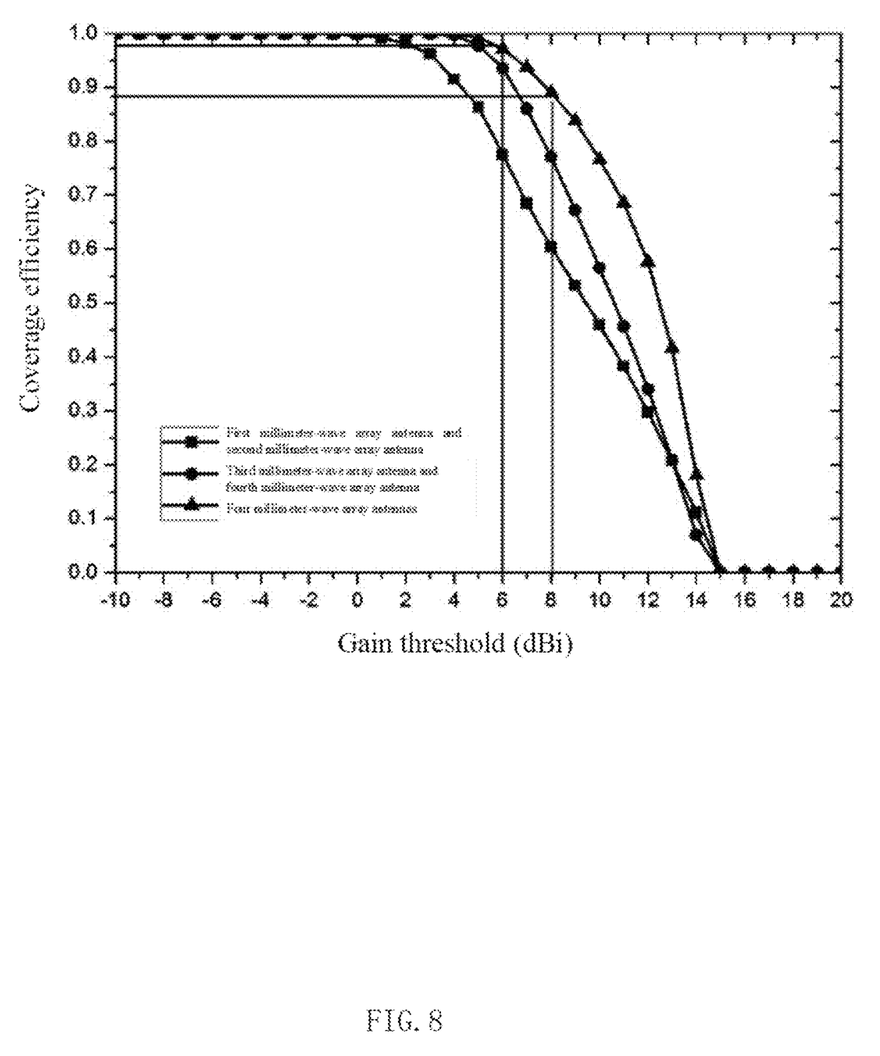
FIG. 8 is a radiation coverage efficiency diagram when four millimeter-wave array antennas in the antenna system provided according to the first embodiment of the present disclosure operate.

FIG. 8 is a beam coverage efficiency diagram when the combination of the first millimeter-wave array antenna 102 and the second millimeter-wave array antenna 104 and the combination of the third millimeter-wave array antenna 106 and the fourth millimeter-wave array antenna 108 operate separately or simultaneously. As can be seen from FIG. 8, the beam coverage efficiency when the four array antennas operate simultaneously is much greater than the beam coverage efficiency when the two antenna combinations operate separately. It can be seen that the antenna system of the present embodiment increases the coverage of the beams and improves the beam coverage efficiency of the antenna system.

In the embodiment of the present disclosure, compared with the related art, the beams of the first millimeter-wave array antenna of the antenna system cover the space of X>0, and the beams of the second millimeter-wave array antenna cover the space of X<0, such that the combination of the beam coverage of the first millimeter-wave array antenna and the beam coverage of the second millimeter-wave array antenna can cover the entire space. In the meantime, the beams of the third millimeter-wave array antenna of the antenna system cover the space of Y>0, and the beams of the fourth millimeter-wave array antenna cover the space of Y<0, such that the combination of the beam coverage of the third millimeter-wave array antenna and the beam coverage of the fourth millimeter-wave array antenna can cover the entire space. The first millimeter-wave array antenna, the second millimeter-wave array antenna, the third millimeter-wave array antenna and the fourth millimeter-wave array antenna are combined to further enhance the coverage efficiency of the antenna system, that is, make the space have relatively strong beams in all directions and ensure the stability of the antenna system to receive signals.

Figure 9:
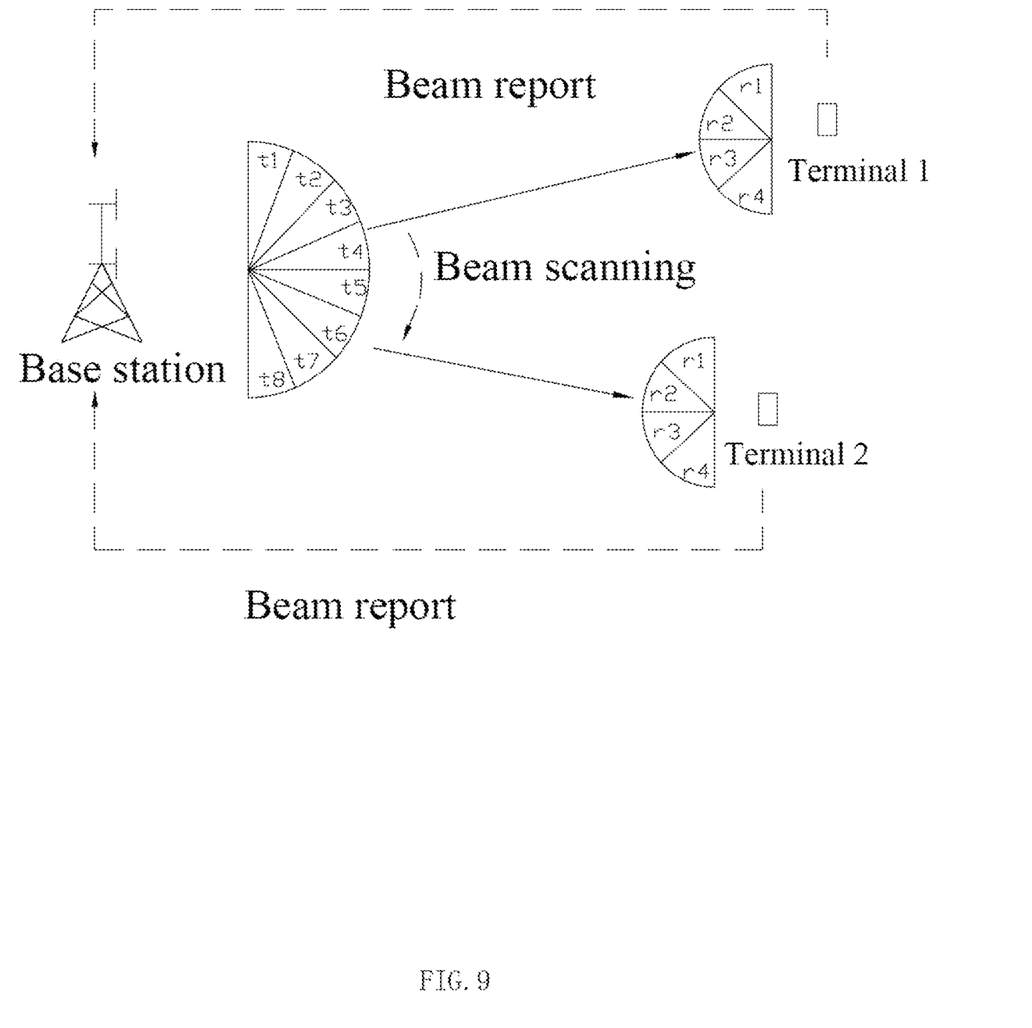
FIG. 9 is a schematic diagram of beam management in the antenna system provided according to the first embodiment of the present disclosure.

Further, in the present embodiment, the base station and the mobile terminal adopt a beam-forming technology to implement a communication connection. The core technology in the beam-forming technology is beam management which aims to align beams of the base station with beams of the mobile terminal with each other so as to maximize a receive gain and a transmit gain in a link. The beam management principle is as shown in FIG. 9: the base station transmits wireless signals in sequence using different beams (such as t1 to t8 in FIG. 9) (beam scanning); the mobile terminal switches the beams (e.g., r1 to r4 in FIG. 9) to receive the wireless signals, and reports related information to the base station (beam report); the mobile terminal determines the preferred beams receiving the wireless signals according to the maximum number of the received wireless signals (beam determination).

In the present embodiment, the following beam management method may be adopted: the base station transmits wireless signals in sequence using different beams; the mobile terminal switches the beams to receive the wireless signals, and determines a gain of a main lobe, facing the base station, of the first millimeter-wave array antenna 101 as a first gain, a gain of a main lobe, facing the base station, of the second millimeter-wave array antenna 102 as a second gain, a gain of a main lobe, facing the base station, of the third millimeter-wave array antenna 103 as a third gain, and a gain of a main lobe, facing the base station, of the fourth millimeter-wave array antenna 104 as a fourth gain. The first largest gain and the second largest gain are selected from the four antenna gains, and the millimeter-wave array antenna corresponding to the first largest gain and the millimeter-wave array antenna corresponding to the second largest gain are used as the millimeter wave array antennas for transmitting signals, thereby realizing multi-input and multi-output (MIMO) or diversity of the antenna and further ensuring the accuracy and stability of the antenna system to transit the signals. Of course, in other embodiments, other beam management methods may also be used. This is only an example here. No matter which beam management method is adopted, the layout of the antenna system in the present embodiment is not affected.

A third embodiment of the present disclosure relates to a mobile terminal 30 which includes an antenna system 10.

Figure 10:
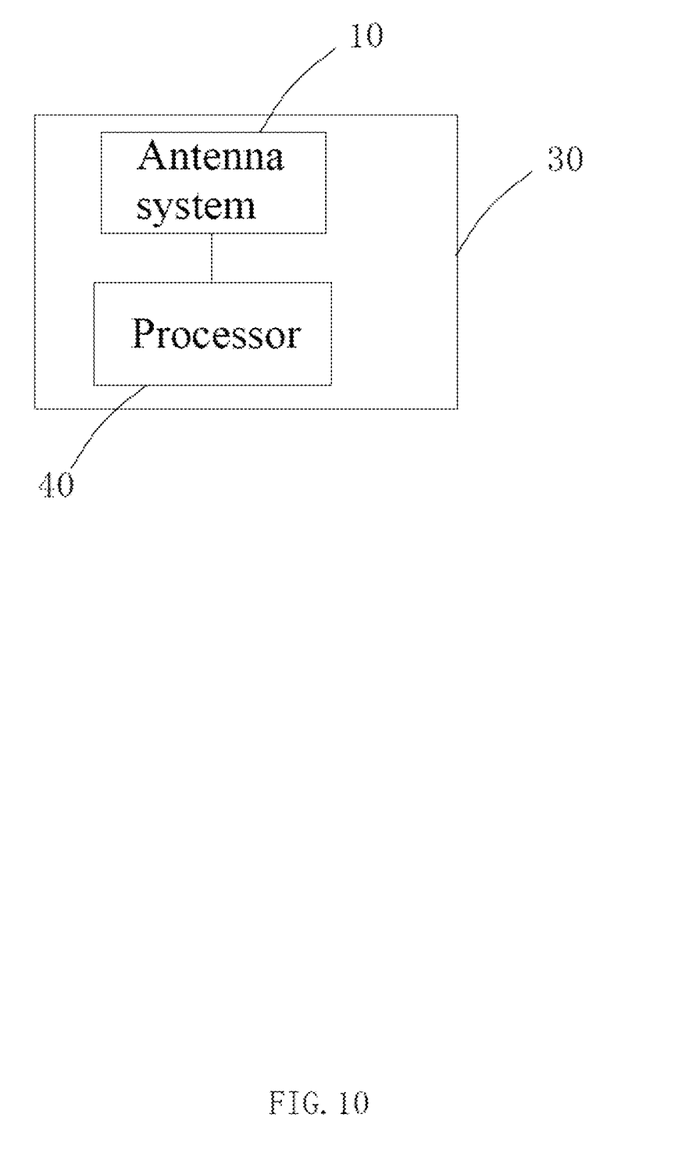
FIG. 10 is a schematic structural diagram of a mobile terminal provided according to a second embodiment of the present disclosure.

Preferably, the mobile terminal 30 further includes a processor 40. The structure of the mobile terminal is as shown in FIG. 10. The processor 40 is specifically configured to: determine a gain of a main lobe, facing the base station, of the first millimeter-wave array antenna as a first gain, a gain of a main lobe, facing the base station, of the second millimeter-wave array antenna as a second gain, a gain of a main lobe, facing the base station, of the third millimeter-wave array antenna as a third gain, and a gain of a main lobe, facing the base station, of the fourth millimeter-wave array antenna as a fourth gain; and select two gains from the first gain, the second gain, the third gain and the fourth gain in a descending order, and use the millimeter-wave array antennas corresponding to the two selected gains for signal transmission.

Specifically, the base station transmits wireless signals in sequence using different beams. The processor switches the beams to receive the wireless signals, and determines a gain of a main lobe, facing the base station, of the first millimeter-wave array antenna as a first gain, a gain of a main lobe, facing the base station, of the second millimeter-wave array antenna as a second gain, a gain of a main lobe, facing the base station, of the third millimeter-wave array antenna as a third gain, and a gain of a main lobe, facing the base station, of the fourth millimeter-wave array antenna as a fourth gain. The processor 40 selects the first largest gain and the second largest gain from the first gain, the second gain, the third gain and the fourth gain, and use the millimeter-wave array antenna corresponding to the first largest gain and the millimeter wave array antenna corresponding to the second largest gain as the array antennas for transmitting signals, thereby realizing multi-input and multi-output (MIMO) or diversity of the antenna and further ensuring the accuracy and stability of the antenna system to transmit the signals. For example, it is assumed that the first gain is A (dB), the second gain is B (dB), the third gain is C (dB), the fourth gain is D (dB), and A<B<C<D, then it is determined the first gain is the first largest gain, and the second gain is the second largest gain. The first millimeter-wave array antenna and the second millimeter-wave array antenna are used for signal transmission.

Figure 11:
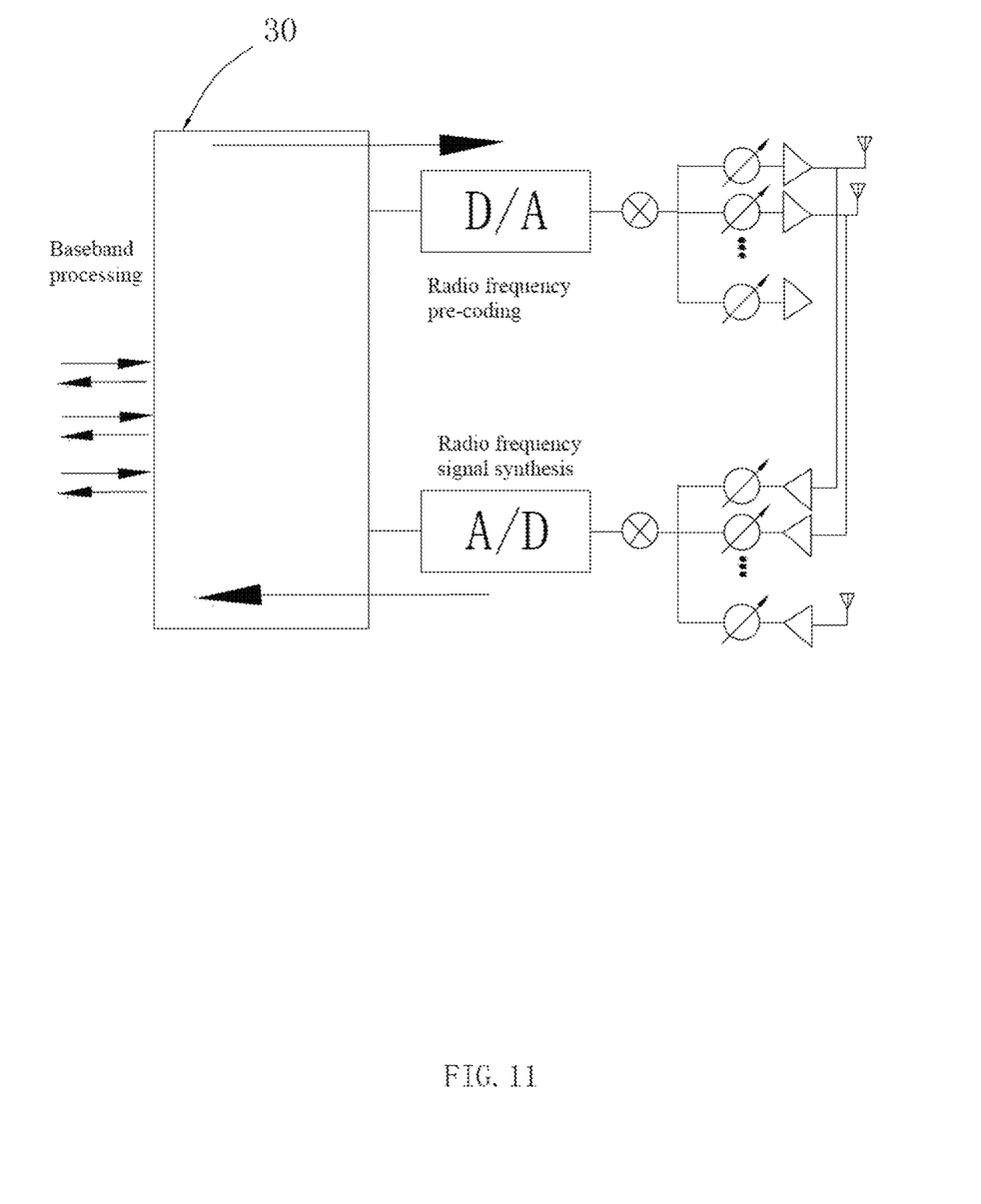
FIG. 11 is a schematic architecture diagram of an antenna system in the mobile terminal provided according to the second embodiment of the present disclosure.

It is worth mentioning that the antenna system in the mobile terminal adopts phased array architecture. The phased array architecture is shown in FIG. 11.

According to the mobile terminal provided by the present embodiment, the processor determines the two millimeter-wave array antennas used for signal transmission through beam management, such that the field intensity of the entire radiation coverage is more balanced and the weak fringe radiation under the single combination is avoided. The simultaneous use of the two millimeter-wave array antennas realizes multi-input multi-output (MIMO) or diversity of the antenna, and enhances the capability of the mobile terminal to receive signals.

It should be understood by those skilled in the art that, all or part of the steps of the methods in the above embodiments may be implemented through programs that give instructions to respective hardware. The programs may be stored in a storage medium and include several instructions to cause a device (which may be a single chip microcomputer, a chip, or the like) or a processor to perform all or part of the steps of the methods of the embodiments of the present disclosure. The foregoing storage medium may be a USB disk, a mobile hard disk, a read-only memory (ROM), a random access memory (RAM), a magnetic disk, an optical disk or other medium, which may store program codes.

Those skilled in the art may understand that the above embodiments are specific embodiments for implementing the present disclosure. In practical applications, various changes in form and detail may be made for the embodiments, without departing from the spirit and scope of the present disclosure.

What is claimed is:

1. A mobile terminal, the mobile terminal is provided with a screen, a back shell arranged opposite to the screen, a circuit board sandwiched between the screen and the back shell and an antenna system, the antenna system including:
    a first feeding point; a first millimeter-wave array antenna electrically connected to the first feeding point; a second feeding point;
    a second millimeter-wave array antenna electrically connected to the second feeding point;
    a third feeding point;
    a third millimeter-wave array antenna electrically connected to the third feeding point;
    a fourth feeding point; and
    a fourth millimeter-wave array antenna electrically connected to the fourth feeding point, which are all disposed on the circuit board,
    when the mobile terminal is placed in a three-dimensional coordinate system that takes a center of the mobile terminal as an origin; an X axis of the three-dimensional coordinate system extends in a major-axis direction of the mobile terminal; a Y axis of the three-dimensional coordinate system extends in a minor-axis direction of the mobile terminal; a Z axis of the three-dimensional coordinate system extends in a thickness direction of the mobile terminal; a positive axis of the X axis points to the top of the mobile terminal; and a positive axis of the Z axis points to the screen,
    the first millimeter-wave array antenna implements beam scanning in a space of X>0;
    the second millimeter-wave array antenna implements beam scanning in a space of X<0;
    the third millimeter-wave array antenna implements beam scanning in a space of Y>0;
    the fourth millimeter-wave array antenna implements beam scanning in a space of Y<0;
    wherein
    the first millimeter-wave array antenna comprises a first feeding network connected to the first feeding point and a first antenna array face fed by the first feeding network;
    the second millimeter-wave array antenna comprises a second feeding network connected to the second feeding point and a second antenna array face fed by the second feeding network;
    the third millimeter-wave array antenna comprises a third feeding network connected to the third feeding point and a third antenna array face fed by the third feeding network; and
    the fourth millimeter-wave array antenna comprises a fourth feeding network connected to the fourth feeding point and a fourth antenna array face fed by the fourth feeding network.

2. The mobile terminal according to claim 1, comprising a processor configured to:
    determine a gain of a main lobe, facing the base station, of the first millimeter-wave array antenna as a first gain, a gain of a main lobe, facing the base station, of the second millimeter-wave array antenna as a second gain, a gain of a main lobe, facing the base station, of the third millimeter-wave array antenna as a third gain, and a gain of a main lobe, facing the base station, of the fourth millimeter-wave array antenna as a fourth gain; and
    select two gains from the first gain, the second gain, the third gain, and the fourth gain in a descending order, and use the millimeter-wave array antennas corresponding to the two selected gains for signal transmission.

3. The mobile terminal according to claim 1, wherein the first antenna array face and the second antenna array face are disposed on two opposite sides in an X axis direction respectively, the first antenna array face facing a positive axis of the X axis, and the second antenna array face facing a negative axis of the X axis; and
    the third antenna array face and the fourth antenna array face are disposed on two opposite sides in a Y axis direction respectively, the third antenna array face facing a positive axis of the Y axis, and the fourth antenna array face facing a negative axis of the Y axis.

4. The mobile terminal according to claim 3, wherein the first antenna array face is disposed on a top of the mobile terminal, and the second antenna array face is disposed on a bottom of the mobile terminal; and
    wherein both the third antenna array face and the fourth antenna array face are closer to the top of the mobile terminal, than to the bottom of the mobile terminal.

5. The mobile terminal according to claim 3, wherein the first antenna array face comprises a plurality of first antenna units; the second antenna array face comprises a plurality of second antenna units; the third antenna array face comprises a plurality of third antenna units; the fourth antenna array face comprises a plurality of fourth antenna units.

6. The mobile terminal according to claim 5, wherein the plurality of first antenna units and the plurality of second antenna units are respectively arranged into a one-dimensional linear array at intervals along the Y axis direction, and the plurality of third antenna units and the plurality of fourth antenna units are respectively arranged into a one-dimensional linear array at intervals along the X axis direction.

7. The mobile terminal according to claim 6, wherein
the first feeding network comprises a plurality of first phase shifters, a number of the plurality of first phase shifters is the same as a number of the plurality of first antenna units, and each of the plurality of first antenna units is electrically connected to the first feeding point through one of the plurality of first phase shifters;
the second feeding network comprises a plurality of second phase shifters, a number of the plurality of second phase shifters is the same as a number of the plurality of second antenna units, and each of the plurality of second antenna units is electrically connected to the second feeding point through one of the plurality of second phase shifters;
the third feeding network comprises a plurality of third phase shifters, a number of the plurality of third phase shifters is the same as a number of the plurality of third antenna units, and each of the plurality of third antenna units is electrically connected to the third feeding point through one of the plurality of third phase shifters; and
the fourth feeding network comprises a plurality of fourth phase shifters, a number of the plurality of fourth phase shifters is the same as a number of the plurality of fourth antenna units, and each of the plurality of fourth antenna units is electrically connected to the fourth feeding point through one of the plurality of fourth phase shifters.

* * * * *